United States Patent [19]

Carlson et al.

[11] 4,157,674

[45] Jun. 12, 1979

[54] COLLAR STUD FOR USE IN PLASTIC

[75] Inventors: Kenneth R. Carlson; Arthur R. Fry, both of Rockford, Ill.

[73] Assignee: Elco Industries, Inc., Rockford, Ill.

[21] Appl. No.: 868,994

[22] Filed: Jan. 12, 1978

[51] Int. Cl.² .............................................. F16B 27/00
[52] U.S. Cl. ......................................... 85/1 R; 85/42
[58] Field of Search ....................... 85/42, 50 R, 1 R; 403/296, 295, 404; 248/188.9

[56] References Cited

U.S. PATENT DOCUMENTS

| 56,124 | 7/1866 | Till ......................................... 85/50 R |
| 184,718 | 11/1876 | Lewis ......................................... 85/42 |
| 1,849,835 | 3/1932 | Jantzen et al. ..................... 248/188.9 |
| 2,140,014 | 12/1938 | Iasillo ................................. 403/296 X |
| 2,531,892 | 11/1950 | Reese ................................... 85/1 R X |
| 2,672,069 | 3/1954 | Mitchell ........................... 85/50 R X |
| 2,827,318 | 3/1958 | White ................................. 403/296 X |
| 3,009,176 | 11/1961 | Knocke ............................. 85/1 R X |
| 3,521,349 | 7/1970 | Gehring ................................. 29/526 |

FOREIGN PATENT DOCUMENTS 2454087  5/1975  Fed. Rep. of Germany .............. 85/42

Primary Examiner—William H. Schultz
Attorney, Agent, or Firm—Leydig, Voit, Osann, Mayer & Holt, Ltd.

[57] ABSTRACT

A collar stud assembly for attachment to a plastic boss having a bore therein comprises a double-ended fastener and a sheet metal cap. The double-ended fastener has a shank with a first thread suitable for threading into plastic on one end thereof, a second thread adapted to threadingly engage a nut or other threaded member on the other end thereof and a collar integral with the shank between the first and second thread for limiting the threading movement of the fastener into the bore of a plastic boss. The shank extends beyond the first thread and includes a raised ring at the end of the first thread for holding the metal cap in position for seating on a plastic boss and a knurl which is spaced from the end of the first thread and which provides a shoulder upon which the metal cap rests. The metal cap is adapted to fit over the end of a plastic boss and the top of the cap is captivated on the land of the shank between the knurl and raised ring.

3 Claims, 2 Drawing Figures

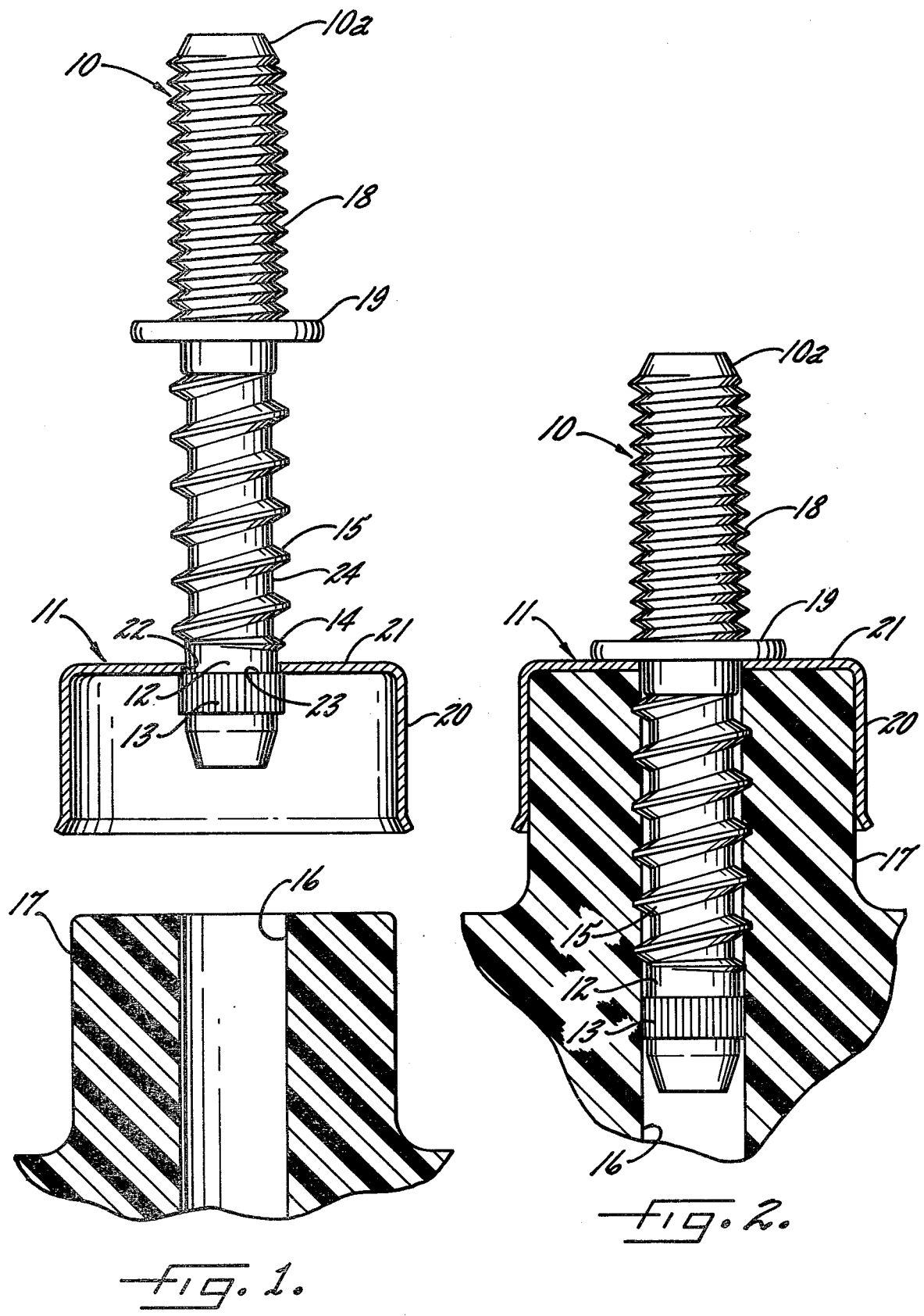

COLLAR STUD FOR USE IN PLASTIC

BACKGROUND OF THE INVENTION

This invention relates to a collar stud assembly and more particularly to a collar stud assembly suitable for use in a plastic boss having a bore therein to facilitate the joining of the plastic boss with another threaded member. In the automotive industry use is made of thermoset plastic resins for numerous large moldings which are assembled to structural members or other components by means of bosses molded integral with these moldings and into which double-ended collar fasteners are threaded.

Typically, the double-ended fasteners have a single shank with a first thread suitable for threading into plastic on one end of the shank, a second thread adapted to threadingly engage a nut or other threaded member on the other end and a collar disposed between the first and second threads and limiting the threading movement of the first and second threads. Although a properly sized bore is provided in the boss, the relatively brittle plastic boss often cracks, with resultant loss of holding power. Moreover the tendency for cracking is further aggravated by imperfections which often occur at the extremity of the boss due to the manner in which the parts are molded. Consequently, considerable loss is incurred in scrapped parts, production is curtailed and quality is questionable. Furthermore, there are times when the boss appears satisfactory at the time of assembly, but then fails in the field because of stress-cracking due to service conditions.

In U.S. Pat. No. 3,521,349 to Gehring, description is made of a method of joining two rigid structural members by means of a threaded fastener which is threaded into a plastic boss protruding outwardly from the surface of the first rigid structural member, the plastic boss being provided with a metal cup-shaped cap which grips the boss sufficiently to prevent the cap from rotating as the threaded fastener is being received through the cap and into the bore in the boss. The purpose of the metal cap is to prevent loosening of the fastener caused by cold flow of the plastic and to prevent cracking and/or fracture of the plastic.

The techniques disclosed in the prior art for joining a plastic member to another structural member by means of a double-ended fastener have not been totally satisfactory. The multiple step process of placing and securing the metal cup-shaped cap over the plastic bore, aligning the opening in the end wall of the cap with the bore in the boss and placing the threaded fastener into the hole in the cap as well as the handling of second small parts, namely the fastener and the metal cap, is considered cumbersome and disadvantageous.

Accordingly, the general object of the present invention is to provide a new and improved collar stud assembly which overcomes the disadvantages of the prior art practices.

More particularly it is an object of the invention to provide a collar stud assembly suitable for use in plastic wherein the double-ended fastener and metal cap may be pre-assembled as a unit and the cap always is in position to fit properly over the boss.

It is another object of the present invention to provide a pre-assembled collar stud unit which insures proper alignment of the fastener and hole in the metal cap with the bore in the plastic boss in a one step process and without the handling of a multiplicity of parts.

Other objects and advantages of the present invention will become apparent from the following discussion and from the drawings.

While the invention is susceptible of various modifications and alternative forms, there will be herein described in detail the preferred embodiments. It is to be understood, however, that it is not intended to limit the invention to the specific forms disclosed. On the contrary, it is intended to cover modifications and alternative forms falling within the spirit and scope of the invention as expressed in the appended claims.

SUMMARY OF THE INVENTION

A collar stud assembly constructed in accordance with the present invention comprises a double-ended fastener having a shank with a first thread suitable for threading into plastic on one end thereof, a second thread adapted to threadingly engage a nut or other threaded member on the other end thereof and a concentric collar on the shank between the first and second threads for limiting the threading movement of the fastener into the bore of a plastic boss, the improvement lying in the configuration at the first thread end of the fastener whereat the fastener is provided with a raised ring at the end of the first thread for holding a metal cap in the proper position for seating on a plastic boss, a knurl which provides a shoulder upon which the end wall of the metal cap rests and the metal cap adapted to fit over the end of a plastic boss, the end wall of the cap being captivated on the land of the shank between the raised ring and knurl. The diameter of the portion of the fastener extending beyond the raised ring and correspondingly, the diameter of the opening in the end wall of the metal cap are greater than the root diameter of the first thread so that the plastic boss may be threaded without the opening in the metal cap being enlarged or threaded. The diameter of the knurl is less than the crest diameter of the first thread and is sized to prevent interference with the bore in the boss to ensure proper threading thereof.

BRIEF DESCRIPTION OF THE DRAWINGS

FIG. 1 is a fragmentary elevational view of a collar stud assembly embodying the invention and a plastic boss for receiving the stud, parts being broken away and shown in section.

FIG. 2 is a view similar to FIG. 1 and shows the collar stud assembly threaded into the plastic boss.

DETAILED DESCRIPTION OF THE INVENTION

As shown in the drawings for purposes of illustration, the invention is embodied in a collar stud assembly having a double-ended fastener 10 and a sheet metal cap 11 captivated on a land 12 of the fastener 10 between an enlarged, knurled portion 13 and a raised ring 14. The illustrative assembly is particularly useful for providing a means for threading the first thread end of the double-ended fastener into the bore in the plastic boss in a one-step process while at the same time avoiding the handling of a multiplicity of parts and minimizing cracking of the plastic boss.

The double-ended fastener 10 has a shank 10a with a first thread 15 for threading into the bore 16 of a plastic boss 17 on one end of the shank, a second thread 18 adapted to threadingly engage a nut or other threaded member on the other end thereof and a concentric collar 19 integral with the shank 10a between the first thread 15 and the second thread 18, the collar being positioned to engage the plastic boss or other threaded member to limit the threading movement of the fastener 10.

For the purpose of preventing excessive radial expansion of the plastic boss 17 and thereby eliminating cracking thereof during threading, the metal cap 11 is fitted closely over the plastic boss 17. The metal cap has a side wall 20 and an end wall 21 with a circular opening 22 therein for receiving the threaded fastener.

In accordance with the present invention, the shank 10a of the fastener 10 extends beyond the first thread 15 and includes a raised ring 14 at the end of the first thread for holding the metal cap, which has been pressed over the knurl 13 and onto the land 12, in the proper position for seating on the plastic boss 17 in preparation for and during threading of the fastener into the boss. The knurl 13 is spaced from the end of the first thread and provides a shoulder 23 upon which the end wall 21 of the metal cap 11 rests, the end wall of the metal cap being captivated on the land 12 of the fastener 10 between the knurl 13 and raised ring 14. The raised ring insures that the metal cap does not ride up the thread prior to application of the collar stud assembly to the plastic boss.

The collar stud assembly is properly positioned on the plastic boss by aligning the shank of the fastener with the bore in the boss and the raised ring holds the metal cap in the proper position on the boss. By applying enough end pressure to the second thread end of the shank to force only the raised ring into the circular opening in the metal cap, the end wall of the cap will snap over the raised ring and fit into the groove 24 positioned between the raised helix of the first thread 15. Thus, when the fastener is threaded into the plastic boss, the opening in the metal cap will ride in the groove 24. In this manner the fastener threadingly engages the plastic boss without threading or enlarging the opening in the metal cap. To accomplish this, the diameter of the fastener below the first thread and, correspondingly the diameter of the opening in the metal cap are dimensioned to be greater than the root diameter of the first thread, but less than the crest diameter thereof. During the entire threading operation, the cap 11 is seated firmly on the boss 17.

In order to preclude interference of the knurl and/or raised ring with the bore in the plastic boss thereby aiding in achieving proper threading of the bore, the diameter of the knurl and the diameter of the raised ring are dimensioned to be less than the crest diameter of the first thread. In addition, and for the same purpose, the diameter of the knurl is dimensioned to be only slightly less than the diameter of the bore so that the knurl functions to guide the fastener into the bore of the plastic boss.

In FIG. 2, the double-ended fastener 10 is shown as having been threaded into the plastic boss 17. As can be seen, the fastener 10 is threaded into the bore 16 of the boss 17 up to the collar, the knurl 13 serving to guide the fastener into and through the bore and the raised ring fitting within the bore and not interfering with the threading of the bore.

It is apparent from the foregoing that the present invention provides a collar stud assembly suitable for use in plastic which is easily threaded into plastic in a one-step process without the necessity of handling a multiplicity of parts.

It will be appreciated by those skilled in the art that various changes and modifications can be made in the details of the collar stud disclosed herein without departing from the spirit and scope of the invention.

We claim:

1. A collar stud assembly for attachment to a plastic boss having a bore therein, said stud assembly comprising:
   a double-ended fastener having a single shank with a first thread suitable for threading into the bore of a plastic boss on one end thereof and a second thread adapted to threadingly engage a member to be attached to the plastic boss on the other end of the shank,
   a concentric collar on the shank of said fastener between the first and second threads for limiting the threading movement of the stud into the bore of the plastic boss,
   the shank of said fastener extending beyond the outer end of the first thread and including an enlarged portion spaced from the end of the first thread and a raised ring at the end of the first thread,
   and a metal cap adapted to fit over said plastic boss, the end wall of said cap being captured between said enlarged portion and said raised ring so that the top of the cap engages the end of said plastic boss,
   said end wall provided with a circular opening dimensioned so that said opening rides in the grooves between the raised helix of the first thread during threading of the plastic boss and is not threaded or enlarged during the threading of said boss.

2. A collar stud assembly as defined in claim 1 in which said raised ring is a continuation of said first thread.

3. A collar stud assembly as defined in claim 1 in which said enlarged portion is knurled.

* * * * *